(12) United States Patent
Hollriegl et al.

(10) Patent No.: US 8,641,409 B2
(45) Date of Patent: Feb. 4, 2014

(54) BLOW MOLD

(75) Inventors: Thomas Hollriegl, Teublitz (DE); Thomas Albrecht, Beilngries (DE); Kaj Fuehrer, Tegernheim (DE)

(73) Assignee: Krones AG, Neutraubling (DE)

( * ) Notice: Subject to any disclaimer, the term of this patent is extended or adjusted under 35 U.S.C. 154(b) by 252 days.

(21) Appl. No.: 13/215,690

(22) Filed: Aug. 23, 2011

(65) Prior Publication Data

US 2012/0052146 A1  Mar. 1, 2012

(30) Foreign Application Priority Data

Aug. 26, 2010  (DE) .......................... 10 2010 039 802

(51) Int. Cl.
*B29C 49/42* (2006.01)
*B29C 49/48* (2006.01)

(52) U.S. Cl.
USPC .......... 425/522; 249/187.1; 425/472; 425/541

(58) Field of Classification Search
USPC ......... 425/522, 526, 541, 472; 249/78, 187.1, 249/205
See application file for complete search history.

(56) References Cited

U.S. PATENT DOCUMENTS

| 4,834,642 | A | * | 5/1989 | Voss et al. ....................... 425/529 |
| 5,346,386 | A | * | 9/1994 | Albrecht et al. ................ 425/541 |
| 6,918,754 | B2 | * | 7/2005 | Albrecht ......................... 425/529 |
| 7,048,531 | B2 | * | 5/2006 | Bianchini ...................... 425/541 |
| 7,137,804 | B2 | * | 11/2006 | Mue et al. ...................... 425/541 |
| 8,070,470 | B2 | * | 12/2011 | Tsau et al. ...................... 425/522 |
| 2009/0232929 | A1 | * | 9/2009 | Blochmann et al. ........... 425/522 |
| 2010/0047375 | A1 | | 2/2010 | Rousseau et al. |
| 2011/0236525 | A1 | * | 9/2011 | Spitzer ........................... 425/541 |
| 2012/0052147 | A1 | * | 3/2012 | Stoiber et al. .................. 425/526 |

FOREIGN PATENT DOCUMENTS

| DE | 3134474 A1 | 3/1983 |
| DE | 19845544 A1 | 4/2000 |
| DE | 69609605 T2 | 4/2001 |
| DE | 102008007631 A1 | 8/2009 |
| EP | 1995038 A1 | 11/2008 |
| WO | WO-2008094649 A2 | 8/2008 |

OTHER PUBLICATIONS

Search Report for German Patent Application No. 10 2010 039 802.0 dated Jan. 28, 2011.
English Translation of First Office Action from the SIPO—People's Republic of China—for Application No. 201110253138.9 dated Jul. 23, 2013.

* cited by examiner

*Primary Examiner* — Robert B Davis
(74) *Attorney, Agent, or Firm* — Marshall, Gerstein & Borun LLP

(57) ABSTRACT

In a blow mold for manufacturing blow molded or stretch-blow molded containers with mold support parts movable relative to each other by a force-transmitting actuation mechanism for opening, closing and locking mold parts defining a mold cavity and mounted to the mold support parts, each mold support is an integrally formed composite component with areas of different materials, wherein at least one first area of a material in the mold support part predominantly is a force transmission element, while at least one second area of another material predominantly is a filling or enclosing or spacer element.

28 Claims, 3 Drawing Sheets

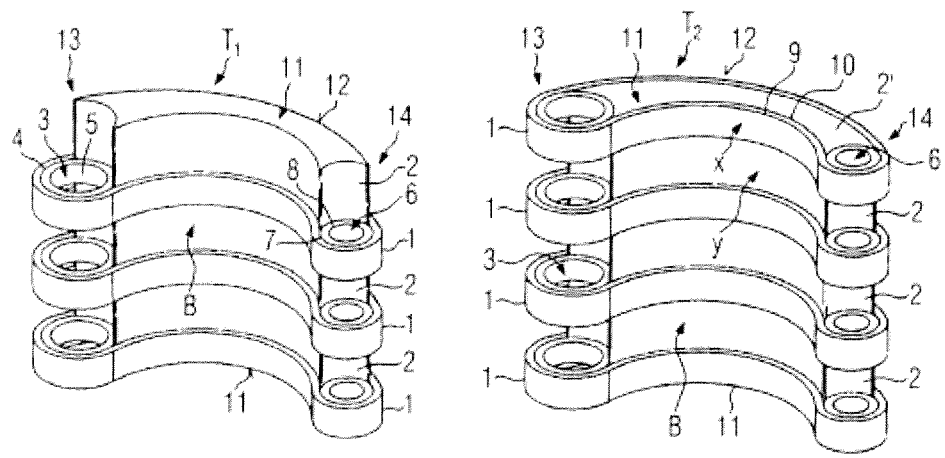
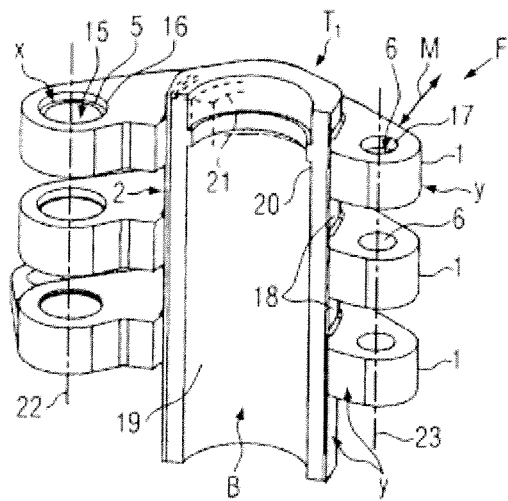
FIG. 1
FIG. 2

BLOW MOLD

CROSS-REFERENCE TO RELATED APPLICATION

The present application claims the benefit of priority of German Application No. 102010039802.0, filed Aug. 26, 2010. The entire text of the priority application is incorporated herein by reference in its entirety.

FIELD OF THE DISCLOSURE

The disclosure relates to a blow mold of the type used to manufacture containers.

BACKGROUND

For blow molds, in particular for blow molding or stretch-blow molding containers of plastics, such as beverage bottles, a structural principle has become prevalent in which the mold support parts, to which the mold parts are mounted, actively perform the manipulations of the blow mold controlled by the actuation mechanism, while the mold parts remain passive. The mold parts are only active during the molding process during which the mold support parts fulfill the locking function of the blow mold and take up and transmit forces. For the manipulations of the blow mold, certain structural features at the mold support parts are necessary by means of which forces can be introduced, removed or received, and for which the mold support parts require a relatively complex variety of molds. The mold support parts of the blow molds, for example of a stretch-blow molding machine, have been manufactured up to now from one single type of material, e.g. as steel castings or aluminum castings. The employed material is homogenous with a constant density and material structure in most cases. This results in a compromise between strength and weight, because, for example, steel involves a higher weight when it exhibits a higher strength, while aluminum, being of a lower weight, has a lower strength. It has to be taken into consideration here that short cycle times and high blow pressures involve quick movements and high forces, so that a compromise between the strength and weight of the mold support parts means an undesired disadvantage.

In a blow mold known from US 2010/0047375 A1, the mold support parts in which the mold parts, except for a bottom mold part, are mounted, are designed with a complex reinforcing rib structure outside, and in a central vertical region of each mold part, a ring segment having a conical outer surface is fixed outside via which, when the blow mold is closed, a circumferentially closed collar with a conical inner surface is axially slid on for locking the mold. No material specifications of the mold support parts are disclosed.

In a blow mold known from EP 1 995 038 A, the mold support parts are formed outside with reinforcing ribs spaced apart and perpendicular to the swiveling axis of the mold support parts which can be folded open and close relative to each other, the reinforcing ribs cooperating with components of the actuation mechanism. The reinforcing ribs are welded on or integrally formed with the mold support parts and contain, for example, bearing eyes for a swivel pin. No material specifications for the mold support parts are disclosed.

However, it is generally known in molds in the mold parts defining the mold cavity to reinforce highly loaded surface areas, e.g. in the mold parting plane or at a bottom mold part, with reinforcing materials, but not optionally provided mold support parts z.

SUMMARY OF THE DISCLOSURE

One aspect of the disclosure is to provide a blow mold of the type mentioned in the beginning whose mold support parts are designed with a reduced weight, but load-oriented, without any compromise between strength and weight.

By each mold support part being integrally formed as a composite component with areas of different materials, where at least one first area of one material predominantly forms a load transmission element, while at least one second area of another material predominantly forms a filling or enclosing or spacer element, materials of high strength can be employed for the force transmission element at points where they are optimally placed for the forces, while the at least one second area of another material fulfills other functions in the mold support part, the other material being, for example, easily moldable and lighter and forming the connection with the first area. At a lower total weight of the mold support part, an optimal and selective, load-oriented strength against high blow pressure is achieved. Quick movements are possible without any losses. A secondary advantage is a compact design of the load- and weight-optimized mold support parts, which is also desirable in blow molding machines having a large number of blow molds arranged close to each other, for example, due to simple actuation mechanisms.

In a suitable embodiment, at least the densities and/or strengths and/or specific weights of the materials used are different in the areas. These material specifications are selectively provided in mutual connection in the mold support part at strategically decisive areas to ensure optimum functionality at a reduced weight.

Suitably, the materials employed in combination are selected from a group at least comprising: light-metal cast material, light metal, also light metal alloys, steel casting material, steel, also steel alloys, plastic material reinforced with carbon fibers and/or glass fibers, non-reinforced plastics or ceramics. Especially light metal or light-metal cast material, reinforced plastic material, non-reinforced plastics and ceramics are characterized by a low specific weight, while steel casting materials and steel only locally have a higher specific weight with a high strength in case of a load-orientated selective employment. Carbon fibers reinforced plastic material or ceramics offer high strength even at a low specific weight. These material relationships are selectively combined with each other in the mold support part to optimize weight and strength.

In a suitable embodiment, the areas of the integrally formed composite component are connected to each other by molding and/or gluing and/or screwing and/or welding and/or pressing and/or a positive connection and/or a non-positive connection and/or injection molding and/or baking in and/or wrapping.

In a suitable embodiment of a mold support part preferably manufactured as molded cast part, at least one area of a material with high strength as inner reinforcement is arranged at least in some areas inside in at least one outer area with a lower strength that presents the shape of the mold support part outside, analogue to the concept in modern engine blocks for internal combustion engines, where the inside area of a material of a higher strength reinforces the whole structure, while the outer area having a lower strength and/or a lower specific weight or a lower density can more easily present the shape and saves weight. So, for example in a casting process, smaller structures and radii can be shaped or be easier worked in machining. The inside area permits to withstand higher forces (pressure/tension/torsion) at specific, highly loaded points, e.g. in bearing eyes or where add-on pieces or mounting pieces are inserted or where overlying components act. Here, the inner area does not have to be completely enclosed by the outer area; the inner area can rather be exposed at certain surface sections, for example, at points where a non-positive or positive connection is required in the manipulation of the blow mold. The material employed for the outer area is, for example, an aluminum ductile cast iron, while the material for the inner area can comprise different types of grey cast iron, carbon fiber plastic reinforced material, ceramics or even optionally plastic elements reinforced with glass fibers. However, the inner area is particularly suitably an inlay which is enclosed by the outer cast part at least in some areas. As an alternative, the concept with the different materials can be realized inversely by at least one area of a material with high strength presenting the shape of the mold support part, and forming an outer reinforcement around at least one inner filling area of materials with a lower strength and/or density and/or specific weight. Here, for example, the inner area forms a lighter inlay in the outer cast part of the material with a higher strength, in particular in case of a mold support part manufactured by a casting process.

In a suitable embodiment of a mold support part manufactured by a casting process, the respective inner area is embodied as prefabricated or cast inlay, and the respective outer area is cast around the inlay. In the casting method, the required intimate connection between the areas is formed, optionally supported by a positive connection consciously aimed at in the casting process, or a consciously aimed at mutual engagement between the areas.

To achieve the positive and non-positive connection or engagement in a mold support part manufactured by a casting process, it can be suitable to provide openings and/or cavities either in the inner area or in the outer area into which the respective other material penetrates.

In an alternative embodiment, the areas are arranged in a layer and/or laminate and/or sandwich structure in the mold support part, where for the connection of the layers, optionally one or several types of connection, as mentioned above, are used.

In a suitable embodiment with a layer and/or laminate and/or sandwich structure at least partially using fiber-reinforced plastic materials, in particular reinforced with carbon fibers, the same or varying layer thicknesses and/or the same or varying fiber orientations are provided among the layers in view of the load-optimized and weight-optimized design of the mold support part.

In a suitable embodiment, at least in the area of a material of high strength, force transmission or force introduction features are provided, e.g. integrated or attached, such as a bearing eye, optionally with a reinforcing bushing, a stop face, an add-on and/or insertion piece, or the like, where the force transmission and/or force introduction feature in the mold support part can be suitably placed to be accessible from outside for the actuation mechanism.

In a more concrete embodiment, the mold support part is a bent composite bowl which comprises an inside boundary for mounting the mold part, an outside boundary, optionally with force transmission or force introduction features, upper and lower end surfaces presenting the bend of the composite bowl, and boundary edges connecting the end surfaces on both sides, where aligned abutments separated from each other by spaces, preferably in the form of drilled or predrilled bearing eyes, optionally with reinforcing bushings of metal, are provided at the boundary edges, these abutments and the force transmission or force introduction features being arranged in the at least one area of the mold support part forming the force transmission element.

In addition, at least one depression for introducing a compensation element can be provided in this integrally formed composite component in the inner boundary of the composite bowl, which is preferably embodied to hold a mold part in a floating manner. The compensation element is, for example, hydraulically acted upon when the blow mold is closed and locked to additionally press the mold parts together in the mold parting plane and to avoid or minimize the visibility of the mold parting plane at the container.

In a suitable embodiment, the mold support part comprises several essentially parallel and spaced apart reinforcing bows which are connected to each other by a mold part mounting bowl to form the composite component. Each reinforcing bow comprises, in an outside enclosing area of a material with a low strength and/or density and/or specific weight, at least one embedded stiffening, bow-like inlay, suitably with included abutments, of at least one material with a high strength and/or density and/or specific weight, where the abutments, if they are present, are exposed in the enclosing area, so that the actuation mechanism can act there without remarkably loading the enclosing area. The reinforcing bows provide the required strength in strategically important areas, while the enclosure and the mold part mounting bowl fulfill additional functions, but permit to reduce the total weight of the mold support part due to the material selection.

In another suitable embodiment, the composite component forming the mold support part comprises several essentially parallel, spaced apart reinforcing bows which are connected to each other via spacers of at least one material with a low strength and/or density and/or specific weight. Here, each reinforcing bow comprises a surrounding outer wall which, for example, fixes a reinforcing bushing and is of a material with a high strength, and inside a filling, preferably as a part of the spacer or spacers, of at least one material with a low strength and/or density and/or specific weight. Here, the outer wall suitably consists of carbon fiber reinforced plastic material, or of steel, while the filling can be made of fiber-reinforced plastics or injection-molded thermosetting plastics or thermoplastics. In an alternative embodiment, each reinforcing bow comprises the outer wall of a steel and/or of carbon fiber reinforced plastic material, where a laminate of materials with low strengths and/or densities and/or specific weights is provided within the outer wall, preferably a laminate of plastic layers, preferably injection-molded thermosetting or thermoplastic layers, and/or of glass fiber reinforced plastic material, or even, for example, lower quality, carbon fiber reinforced plastic material.

In another embodiment, the spacers, preferably in the form of a structure passing through all reinforcing bows, of at least one material of low strength and/or density and/or specific weight comprise layers of the same or unlike thicknesses which are piled up flatly and connected to each other in a material or positive connection, and in a non-positive connection.

In this case, the layers can consist of fiber-reinforced plastic material or even carbon fiber reinforced plastic material, i.e. fibers embedded in a plastic matrix, where in at least some layers, various fiber orientations can be provided. Here, the fiber orientations in at least some layers can be selected to be twisted or offset relative to each other, for example in layers of identical fibrous tissue, or the layers are formed of fibrous tissue in which, for example, weft and warp fibers or threads extend at varying angles with respect to each other. Being of a low weight, this layer structure offers relatively high strength and permits a load-oriented design, for example by the layer thicknesses and/or the fiber orientations.

In an alternative embodiment, layers of light sheet metals are cut or stamped and welded or screwed to each other for the layer structure to reduce the total weight of the mold support in connection with the reinforcing bows.

In a further, particularly suitable embodiment, the mold support part or its composite bowl comprises a core of a material with a low strength and/or density and/or specific weight, preferably of fiber reinforced plastics or a metal, such as a light metal or a light metal alloy, for example as a cast part, and a plastic tissue reinforced with carbon fibers is wrapped around this core and connected to it in a material connection. This embodiment realized by wrapping is in a way analogue to the cast embodiment with a weight-reducing inlay.

BRIEF DESCRIPTION OF THE DRAWINGS

Embodiments of the subject matter of the disclosure will be illustrated with reference to the drawings. In the drawings:

FIG. 1 shows two mold support parts pertaining to a blow mold in a perspective representation, FIG. 2 shows another embodiment of a mold support part, analogue to the mold support part shown in the right of FIG. 1.

DETAILED DESCRIPTION OF THE PREFERRED EMBODIMENT

Figures 3, 4:
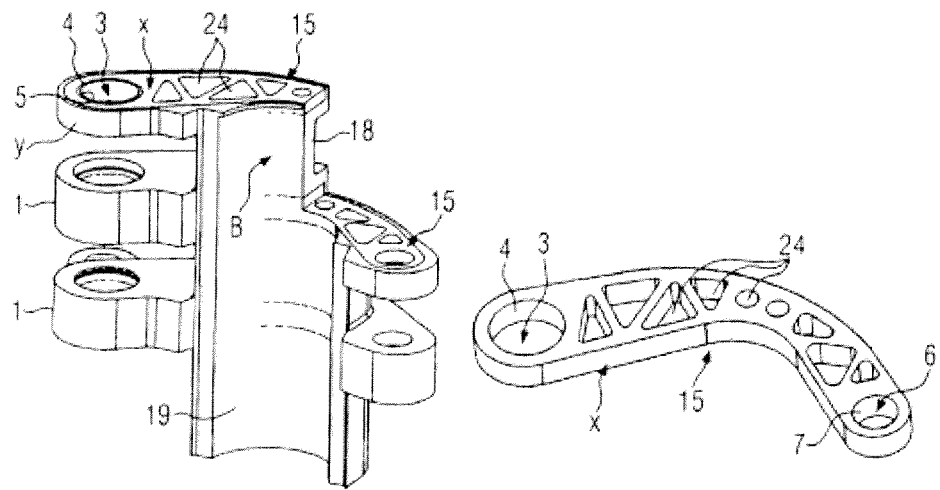
FIG. 3 shows the mold support part of FIG. 2 in a partially sectional perspective representation to illustrate the internal structure.
FIG. 4 shows an inlay shown detached from the mold support part of FIG. 3.

FIG. 1 shows two related mold support parts T1, T2 of a blow mold illustrated with reference to FIG. 2, in particular for blow molding or stretch-blow molding containers, such as plastic beverage bottles, in anon-depicted blow molding machine. The two mold support parts T1, T2 in FIG. 1 are integrally formed composite components each in the form of a bent composite bowl with several, essentially parallel and spaced apart reinforcing bows 1 which are connected to each other via spacers 2. The spacers 2 can form one spacer passing through the reinforcing bows, or be connected to each other, for example, in a material connection or in any other way.

At an end at an edge 13 of the composite bowl, each reinforcing bow 1 comprises an abutment 3, for example in the form of a bore 4, lined with a metallic reinforcing bushing 5, and optionally another abutment 6 in the form of a bore 7, lined with a metallic reinforcing bushing 8 at the other edge 14 of the composite bowl. The reinforcing bow 1 is dominated by at least one outer wall 9 which presents the shape of the reinforcing bow and the composite bowl and in the mold support part T1, T2 defines, as predominant force transmission element, an area of a material X with an at least high strength, for example of steel or of a plastic material reinforced with carbon fibers. The interior 10 enclosed by the outer wall 9, except for the reinforcing bushings 5, 8, is filled by the spacer 2 which is made of a material Y with a low strength and/or density and/or specific weight to reduce the total weight T1, T2 of the mold support part. The composite bowl has upper and lower end surfaces 11 presenting the bend of the composite bowl and connected via the edges 13, 14. The concave inner side of the composite bowl forms a boundary B which is designed to mount a mold part defining the mold cavity of the blow mold (FIG. 2), which is not shown. Furthermore, the composite bowl has a convex outer boundary 12 at which, at least at a reinforcing bow 1, add-on or insertion pieces or stop faces can be arranged, which is not shown. These parts can serve to introduce or transmit force in the manipulation at the mold support part T1, T2 or the blow mold, just as the abutments 3, 6.

The abutments 3, for example, serve to couple the two mold support parts T1, T2 (in a position of the mold support part T1 rotated to the front out of the drawing plane by 180°) by means of an inserted shaft defining the swiveling axis, so that they can be swiveled relative to each other. The abutments 6, however, for example serve to lock the mold support parts T1, T2 swiveled towards each other by an inserted locking element or acting locking components. With the mentioned not shown add-on or insertion pieces, suitably at the reinforcing bows 1, the mold support parts T1, T2 can be manipulated to open and close the blow mold, or operate in the blow molding station with components cooperating with them. The material X with high strength can have a higher density and/or a higher specific weight than the material Y, however, the higher strength can in this region also provide high strength at a low specific weight, e.g. when carbon fiber reinforced plastic material is used.

The spacers 2 can, for example, consist of fiber-reinforced plastics, e.g. glass fiber reinforced plastics, or of light metal or a light metal alloy. The outer wall 9 of the reinforcing bow 1 could also be a ceramic component with a high strength (high-strength ceramics with a relatively low weight. The spacers 2 could be glued or screwed to each other.

FIG. 2 shows another embodiment of the mold support part T1, for example, in the form of an integrally formed composite component manufactured by casting. FIG. 2 furthermore illustrates the arrangement of a shaft 29 which represents the swiveling axis of the mold support parts T1, T2 in the blow mold F, as well as an inserted locking pin 23 to lock the blow mold, where a force-transmitting actuation mechanism M indicated by a double arrow for handling the blow mold F, for example, acts at at least one of the reinforcing bows 1.

The embodiment of the mold support part T1 shown in FIG. 2 is manufactured by casting by an inlay 15 of a material X of high strength, for example as a prefabricated part or a prefabricated cast part, being cast into an enclosure of a material Y with a low strength and/or density and/or specific weight and connected to it in a material connection in each reinforcing bow 1. At least one inlay 15 can be contained in each reinforcing bow 1, where an access to the reinforcing bushings 5, 6 is formed in the enclosure, suitably by bores 16, 17. A mold part mounting bowl 19, suitably also of a material Y with a low strength and/or density and/or specific weight, is integrally connected with the enclosures of the material Y, which takes on the function of the spacer 2 of FIG. 1 and positions the reinforcing bows 1 relative to each other and connects them to each other. The mold part mounting bowl 19 forms the inner boundary B of the composite bowl of the mold support T1 in which, for example, a mold part 21 defining one half of the mold cavity of the blow mold F is mounted, which is indicated in a dashed line. The mold part 21 can be tightly mounted or held in a floating manner. In the latter case, anon-depicted compensation element can be introduced into a depression 20 formed in the mold part mounting bowl 19. The mold part mounting bowl 19 is integrated in the reinforcing bows 1 such that it tightly connects the reinforcing bows 1 via webs 18 (as illustrated with reference to FIG. 3).

In FIG. 3, an upper part of the uppermost reinforcing bow 1 and a right-hand part of the composite bowl are cut away to illustrate the internal structure of the mold support part T1 of FIG. 2. The inlay 15 which consists of the material X of high strength can be prefabricated by casting or machining, and then be cast into the enclosure. As an alternative, the inlay can be a shaped part of plastic material reinforced with carbon fibers which is baked and inserted as an inlay when the mold support part T1 is cast. Even a prefabricated inlay of ceramic material, suitably high-strength ceramics, can be used for reinforcement. To improve the connection between the enclosure of the material Y and the inlay 15 of the material X, openings or cavities 24 can be formed in the inlay 15 into which the material of the enclosure penetrates and engages therein. The abutments 3, 6 can be prepared, for example, in the form of bores 4, 7 in the inlay 15 and are then, for example, lined with reinforcing bushings 5. The mold part mounting bowl 19 is integrally formed with the enclosures of the reinforcing bows 1.

In FIGS. 2 and 3, the inlay 15 forms a force transmission or force introduction element and a reinforcement in each reinforcing bow 1, while the enclosure of the material Y presents the external shape of the mold support part T1 in detail. FIG. 4 illustrates the detached inlay 15 of the material X at least with a high strength and the abutments 3, 6 and the openings or recesses 24.

As an alternative, the concept illustrated with reference to FIGS. 2 to 4 could also be realized inversely, i.e. the enclosure at least of the reinforcing bows 1, and optionally also the mold part mounting bow 19, are made of a material X with a high strength by casting, and the respective inlay 15 is prefabricated of a material Y with a low strength and/or density and/or specific weight and is cast into the enclosure as a spacer or filling element, so that the material X with a high strength presents the external shape of the mold support part T1 by casting, while the inlays 15 of the material Y with an at least low strength and/or density and/or specific weight form filling elements which support the force introduction or force transmission function of the reinforcing bow 1, but reduce the total weight of the mold support part T1.

Figures 5, 6:
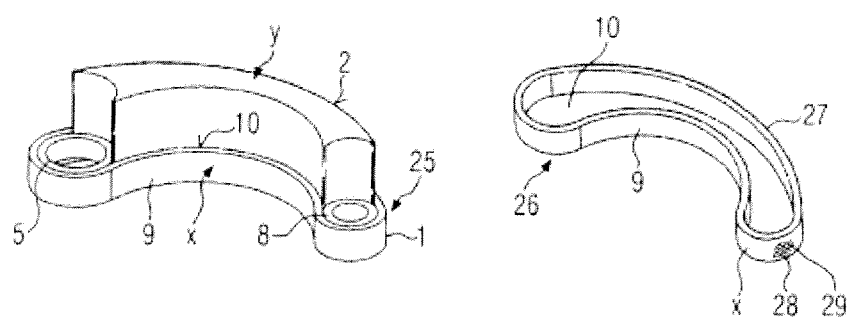
FIG. 5 shows a part of a mold support part of another embodiment in a perspective representation.
FIG. 6 shows a detached detail of FIG. 5 in a perspective representation.

FIG. 5 illustrates a component, for example, for manufacturing the embodiment of the mold support part T1 of FIG. 1 which comprises a stacked structure or layered structure of several identical components according to FIG. 5. The reinforcing bow 1 with the outer wall 9 of a material X with an at least high strength, e.g. according to FIG. 6 of carbon fibers 29 embedded in a plastic matrix 28, is first provided as a ring in a still deformable state which is first brought to the bent shape of the reinforcing bow 1 or the outer wall 9, respectively (FIG. 6), and then baked under the influence of temperature and pressure. For example, carbon fiber tissue with weft and warp threads and a plastic preimpregnation (a so-called prepreg), which is commercially available in different specifications, is suited for this. The outer wall 9 deformed in FIG. 6 is then baked, so that it becomes dimensionally stable and highly strong and defines the interior 10. As an alternative, the outer wall 9 could also be manufactured of high-strength steel 27. The reinforcing bushings 5, 8 are (FIG. 5) glued in or pressed in before the spacer 2 is inserted into the interior 10, for example of fiber-reinforced plastics or non-reinforced plastics in an injection-molding process. As an alternative, the spacer 2 could be prepared of a light metal, such as aluminum or an aluminum alloy, by machining, or made by casting, for example cast into the interior 10, or pressed in and glued in or even screwed.

Figure 7:
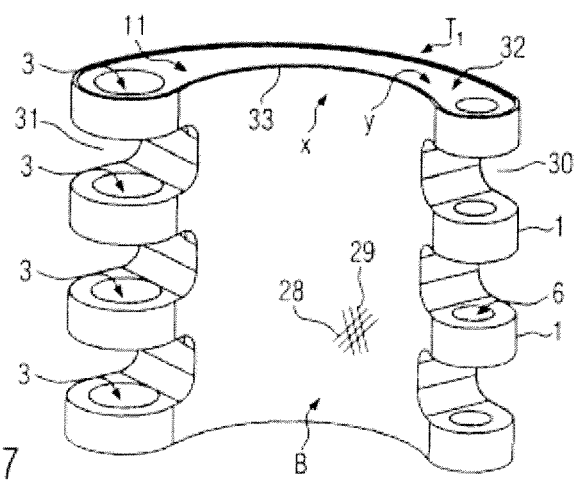
FIG. 7 shows another embodiment of a mold support part in a perspective representation.

FIG. 7 illustrates another embodiment of the mold support part T1. In this embodiment, a core 32 of at least one material Y with a low strength and/or density and/or specific weight is contained in the composite bowl which is at least in some areas or completely wrapped by an enclosure 33 of a material X with a high strength, suitably plastic material reinforced with carbon fibers, such as a tissue or several tissue layers, where the enclosure 33 presents the external shape of the mold support part T1 and is a force transmission or/and force introduction element. The carbon fibers 29 embedded in the plastic matrix 28 (weft and warp threads of a tissue) are indicated at the inner boundary B which is used to mount the non-depicted molded part. In the shown embodiment, the end surfaces 11 of the composite bowl are not covered by the enclosure 33, as optionally also spaces 30 and 31 between the here completely integrated reinforcing bows 1 or the abutments 3, 6. However, the spaces 31 and the end surfaces 11 could also be covered with the enclosure 33. The core 32 could comprise fiber-reinforced plastics or consist of a metal, for example, a light metal, and be preshaped by casting or machining. The abutments 3, 6 can be lined with reinforcing bushings (not shown).

Figure 8:
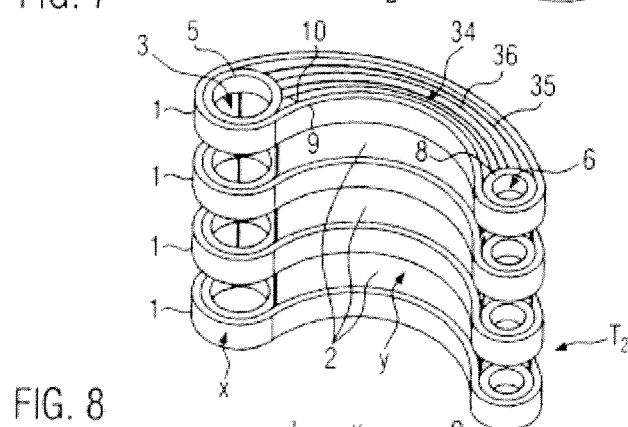
FIG. 8 shows another embodiment of a mold support part in a perspective representation.

FIG. 8 illustrates an embodiment of the mold support part T1 similar to that of FIG. 1, however with a laminate structure of the reinforcing bows 1 which are connected via the spacers 2 of a material Y at least with a low strength and/or density and/or specific weight in the composite bowl. The laminate structure is indicated at 34 and comprises, for example, within the inner wall 9 of material X of high strength, several laminate layers 35, 36 which are formed, for example, of injection-molded plastics, fiber-reinforced plastics, or a plastic material reinforced with carbon fibers of a lower quality than that, for example, of the outer wall 9, and are connected to each other at least in a material connection. The laminate structure 34 in the interior 10 of the outer wall 9 also fixes the reinforcing bushings 5, 8 of the abutments 3, 6.

Figure 9:
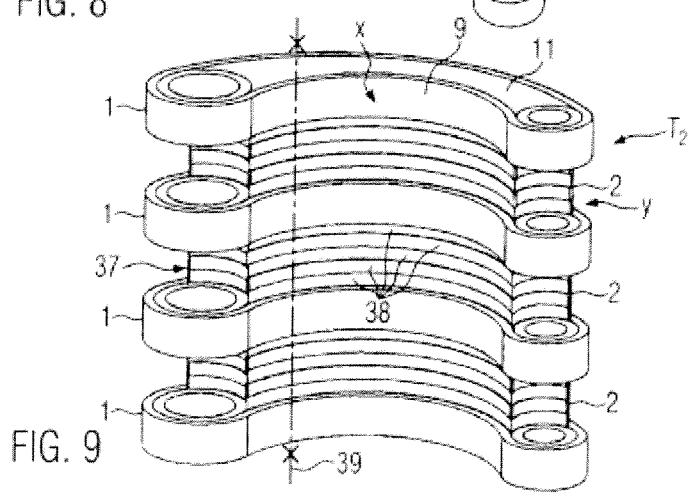
FIG. 9 shows another embodiment of a mold support part in a perspective representation.

FIG. 9 illustrates an embodiment of the mold support part T2 with a layer structure of the spacers 2, where the layer structure of interconnected layers 38 optionally passes through all reinforcing bows 1 or interconnects the reinforcing bows 1 embodied according to FIG. 8 or FIG. 5 or FIG. 2. Each layer structure 35 could be a block 37 or, as mentioned, a continuous block 37. The layers of the layer structure 38 are formed, for example, of plastic material reinforced with carbon fibers and glued to each other. As an alternative, the layers of the layer structure 38 could be cut-out or stamped out preform parts of light sheet metal which are welded or glued to each other or, as indicated at 39, screwed to each other. If the layers of the layer structure 38 are formed of plastic material reinforced with carbon fibers (tissue layers), the fiber orientations among the layers could vary to achieve an optimization of the distribution of the pressure, tensile and torsional forces in the mold support part. The orientation of the fibers can be selected to be unidirectional (layered horizontally and/or vertically), with different angles of the fibers relative to each other, e.g. at right angles or at angles of 30°, but it can also be varied bidirectionally, i.e. the for example weft and warp fibers in the tissue extend at different angles with respect to each other. In the layer structure, tissue mats of always the same texture, i.e. the same fiber arrangement, or tissue mats of different textures, i.e. with different orientations of the fibers, can be used.

This layer structure 38 can also be realized with tissue mats of glass fiber reinforced plastic material, i.e. a material Y with a low strength, as the reinforcing bows 1 are the predominant force transmission and force introduction elements of the composite bowl of the mold support part T2.

Basically, embodiments are possible in which two materials X, Y with different strengths and/or densities and/or specific weights are employed. This, however, does not exclude to employ more than only two materials X, Y with different strengths and/or densities and/or specific weights in combination. Independent of the realized concept, by the integrally formed composite component which constitutes the mold support part T1, T2, it is aimed at to achieve an optimized load orientation for forces and a weight optimization, so that the mold support part, having a low weight and optionally compact dimensions, optimally fulfills the required functions of force transmission or force introduction.

The invention claimed is:

1. Blow mold for manufacturing blow molded or stretch-blow molded containers, comprising mold support parts movable relative to each other by a force-transmitting actuation mechanism for opening, closing and locking mold parts defining a mold cavity and mounted to the mold support parts, each mold support part being an integrally formed composite component with areas of different materials, and in the mold support part, at least one first area of a material predominantly is a force transmission element, and at least one second area of another material is predominantly one of a filling or an enclosing or a spacer element;

wherein in an area of a material of high strength, at least one force transmission or force introduction feature is provided and placed at the mold support part to be accessible from outside; and wherein the mold support part is a bent composite bowl which comprises an inside boundary for mounting a mold part, an outside boundary, upper and lower end surfaces presenting the bend of the composite bowl, and abutments which are each aligned and separated by spaces, and the abutments and the force transmission features, the force introduction features, or the combination thereof are arranged in or at the respective force transmission element, respectively.

2. The blow mold according to claim 1, wherein at least one of the densities, strengths, specific weights, and a combination thereof, of the different materials differ from each other.

3. The blow mold according to claim 1, wherein the different materials comprise at least one member of the group consisting of: light-metal cast material, light metal, steel casting material, steel, carbon fiber reinforced plastic material, glass fiber reinforced plastic material, non-reinforced plastics, ceramics and combinations thereof.

4. The blow mold according to claim 1, wherein the material areas are interconnected by one of casting in, gluing, screwing, welding, pressing, a positive connection, a non-positive connection, injection molding, baking in, wrapping, and a combination thereof.

5. The blow mold according to claim 1, wherein in the mold support, the areas at least of the material with one of a lower strength, density, specific weight, or a combination thereof are arranged in one of a layer, laminate, and sandwich structure or a combination thereof.

6. The blow mold according to claim 5, wherein in a layer, laminate, sandwich, and combination thereof structure using fiber-reinforced plastic material, one of the same or varying layer thicknesses, the same or varying fiber orientations among the layers, and a combination thereof are provided.

7. The blow mold according to claim 1, wherein at least one depression for introducing a compensation element is formed in the inside boundary.

8. The blow mold according to claim 1, wherein the mold support part comprises a plurality of parallel, spaced apart reinforcing bows which are interconnected via a mold part mounting bowl, and that each reinforcing bow comprises, in an outside enclosing area of a material with one of a lower strength, density, specific weight, and combination thereof, at least one embedded, stiffening and force-transmitting bow-like inlay of at least one material with one of a higher strength, density, specific weight, or combination thereof with the abutments, the abutments being exposed in the enclosing area.

9. The blow mold according to claim 1, the mold support part comprises a plurality of parallel, spaced apart reinforcing bows, which are interconnected via spacers of a material with one of a lower strength, density, specific weight, and combination thereof, and that each reinforcing bow comprises a surrounding outer wall of a material with a high strength and a filling within the surrounding outer wall of a material with one of a lower strength, density, specific weight, and combination thereof, wherein the outer wall consists of carbon fiber reinforced plastic tissue, and the filling consists of one of fiber-reinforced plastics, injection-molded thermosetting plastics, and thermoplastic.

10. The blow mold according to claim 9, wherein each reinforcing bow in the outer wall consists of one of steel, carbon fiber reinforced plastics, and a combination thereof, and comprises, within the outer wall, a laminate of materials with one of a lower strength, density, specific weight, and a combination thereof.

11. The blow mold according to claim 9, wherein the spacers are manufactured of layers of at least one material with one of a lower strength, density, specific weight, or combination thereof which are one of flatly piled up, connected in a material connection, and connected in a positive or non-positive connection, and have one of the same and unlike thicknesses.

12. The blow mold according to claim 11, wherein the layers consist of fiber reinforced tissues or carbon fiber reinforced tissues glued to each other with a plastic matrix, and that differing fiber orientations are provided in at least some layers.

13. The blow mold according to claim 11, wherein the layers are cut or stamped out of light sheet metals and welded or screwed to each other.

14. The blow mold according to claim 1, wherein the mold support part comprises a core of a material with one of a lower strength, density, specific weight, and that the core is outside wrapped in a tissue comprising carbon fibers in a plastic matrix and connected in a material connection with it.

15. The blow mold according to claim 6, wherein the fiber-reinforced plastic material is reinforced with carbon fibers.

16. The blow mold according to claim 1, wherein the at least one force transmission or force introduction feature is an abutment.

17. The blow mold according to claim 16, wherein the abutment comprises one of a bearing eye, a bearing eye with a reinforcing bushing, a stop face, an add-on piece, an insertion piece, and a combination thereof.

18. The blow mold according to claim 1, wherein the at least one force transmission or force introduction feature is for action by the actuation mechanism.

19. The blow mold according to claim 1, wherein the outside boundary has one of force transmission features, force introduction features, and a combination thereof, and wherein the one of force transmission features, force introduction features, and combination thereof are arranged in or at the respective force transmission element, respectively.

20. The blow mold according to claim 1, wherein the spaces comprise drilled or shaped bearing eyes.

21. The blow mold according to claim 20, wherein the drilled or shaped bearing eyes are lined with metallic reinforcing bushing at both the inside and outside boundary edges that connect the upper and lower end surfaces.

22. The blow mold according to claim 9, wherein the filling is a part of the spacer or spacers.

23. The blow mold according to claim 10, wherein the laminate is a laminate of plastic layers.

24. The blow mold according to claim 23, wherein the plastic layers is formed of one of injection-molded thermosetting plastic, thermoplastic, glass fiber reinforced plastic, carbon fiber reinforced plastic, or a combination thereof.

25. The blow mold according to claim 11, wherein the spacers are in the form of a structure area passing through all reinforcing bows.

26. The blow mold according to claim 14, wherein the material of the core of the mold support part is formed of one of a fiber-reinforced plastic and of a metal.

27. The blow mold according to claim 26, wherein the metal comprises a light metal.

28. Blow mold for manufacturing blow molded or stretch-blow molded containers, comprising mold support parts movable relative to each other by a force-transmitting actuation mechanism for opening, closing and locking mold parts defining a mold cavity and mounted to the mold support parts, each mold support part being an integrally formed composite component with areas of different materials, and in the mold support part, at least one first area of a material predominantly is a force transmission element, and at least one second area of another material is predominantly one of a filling or an enclosing or a spacer element;

wherein in at least one of the mold support parts, at least one area of a material with a high strength is arranged, either as inner reinforcement at least in some areas inside in at least one outer area of a material with one of a lower strength, density, specific weight, and combination thereof presenting the shape of the mold support part, or as an outer reinforcement presenting the shape of the mold support part at least in some areas outside around at least one inner filling area of a material with one of a lower strength, density, specific weight, and combination thereof;

wherein either the outer area presenting the shape of the mold support part of a material with one of a lower strength, density, specific weight, and combinations thereof, or the outer reinforcement presenting the shape of the mold support part around the inner reinforcement embodied as prefabricated or cast inlay or the inner filling area embodied as prefabricated or cast inlay, is cast; and wherein the inlay is embodied with one of openings, cavities, or a combination thereof reinforcing the positive and non-positive connection between the areas interconnected by casting.

* * * * *